(12) United States Patent
Takuno et al.

(10) Patent No.: US 8,594,279 B2
(45) Date of Patent: Nov. 26, 2013

(54) COMMUNICATION APPARATUS

(75) Inventors: Shinji Takuno, Tottori (JP); Satoru Moriyama, Tottori (JP)

(73) Assignees: Sanyo Electric Co., Ltd., Osaka (JP); Sanyo Consumer Electronics Co., Ltd., Tottori (JP)

( * ) Notice: Subject to any disclaimer, the term of this patent is extended or adjusted under 35 U.S.C. 154(b) by 93 days.

(21) Appl. No.: 13/394,308

(22) PCT Filed: Aug. 3, 2010

(86) PCT No.: PCT/JP2010/063065
§ 371 (c)(1),
(2), (4) Date: Mar. 5, 2012

(87) PCT Pub. No.: WO2011/033870
PCT Pub. Date: Mar. 24, 2011

(65) Prior Publication Data
US 2012/0163562 A1    Jun. 28, 2012

(30) Foreign Application Priority Data
Sep. 18, 2009  (JP) ................................. 2009-217075

(51) Int. Cl.
*H04M 11/00* (2006.01)
(52) U.S. Cl.
USPC .................................. 379/46; 379/37; 379/40

(58) Field of Classification Search
USPC ...................................... 379/37–51, 80, 88.01
See application file for complete search history.

(56) References Cited

U.S. PATENT DOCUMENTS 4,558,181 A * 12/1985 Blanchard et al. .............. 379/40

FOREIGN PATENT DOCUMENTS

| JP | 2003-217058 | 7/2003 |
| JP | 2004-023709 | 1/2004 |
| JP | 2005-283491 | 10/2005 |
| JP | 2007-072917 | 3/2007 |
| JP | 2009-089091 | 4/2009 |
| JP | 2009-201012 | 9/2009 |

* cited by examiner

*Primary Examiner* — Stella Woo
(74) *Attorney, Agent, or Firm* — McDermott Will & Emery LLP (57) ABSTRACT

A communication apparatus comprises: a disaster information receiving section connected to a communication line for receiving disaster information therefrom; a microphone; a speech recognizing section for recognizing speeches input from the microphone; a communication section; and a control section. When the disaster information receiving section receives disaster information from the communication line, the speech recognizing section starts recognizing speeches from the microphone. When the speech recognizing section recognizes the presence of the speeches from the microphone, the control section controls the communication section to make a call to a predetermined destination of communication.

10 Claims, 3 Drawing Sheets

COMMUNICATION APPARATUS

RELATED APPLICATIONS

This application is the U.S. National Phase under 35 U.S.C. §371 of International Application No. PCT/JP2010/063065, filed on Aug. 3, 2010, which in turn claims the benefit of Japanese Application No. 2009-217075, filed on Sep. 18, 2009, the disclosures of which Applications are incorporated by reference herein.

TECHNICAL FIELD

The present invention is related to a communication apparatus which is connected to a wide area communication network to perform communication, and in particular, to a communication apparatus which receives an earthquake early warning distributed by a meteorological agency and gives evacuation instructions according to an estimated length of time remaining before the arrival of the principal shock of an earthquake.

BACKGROUND ART

The development of communication infrastructure in recent years has made various supplementary services widespread in the field of communication. For example, in the case of telephone apparatuses, those which are capable of being connected not only to general telephone lines but also to wide area communication networks such as an IP telephone network and the Internet to receive various services such as a data communication service are widely used.

One of the functions of such a communication apparatus is a function of receiving an earthquake early warning which is distributed by a meteorological agency when an earthquake has occurred. An information delivery service called "the Earthquake Early Warning service" was launched in Japan on Oct. 1, 2007. This service is available to any user of a communication apparatus capable of receiving earthquake early warnings who has bought the communication apparatus and signed up with an Earthquake Early Warning delivery service provider.

On receiving an earthquake early warning at an occurrence of an earthquake, the communication apparatus uses regional information which is stored therein in advance such as the latitude/longitude information of the location where it is placed, to thereby calculate, for example, estimated earthquake intensity and an estimated arrival time of the principal shock (=part of the earthquake motion that is felt by the human body as the strongest shock, normally the S-wave).

The result of such calculation is notified to the user through, for example, an image displayed on a liquid crystal panel or sound output from a speaker. This allows the user to take actions to secure safety by, for example, hiding himself/herself under a table or turning off heat sources before the principal shock reaches his/her place from the hypocenter.

As an example of such an apparatus that is capable of receiving earthquake early warnings described above, Patent Literature 1 discloses an image processing apparatus capable of reducing the possibility of a secondary disaster following an earthquake, such as a fire, than before. This image processing apparatus is provided with communication control means which communicates with an external apparatus and power supply control means which changes the energization state of the apparatus.

When the communication control means receives an earthquake early warning from the external apparatus, the power supply control means is controlled to change the energization state. By controlling the power supply based on external information in this way, it is possible to prevent erroneous detection of an earthquake due to a shake other than an earthquake shake coming from a nearby construction work or caused by an accidental collision of something with the apparatus, to thereby secure safety without sacrificing convenience.

As another example such an apparatus that is capable of receiving earthquake early warnings described above, Patent Literature 2 discloses a portable earthquake early warning apparatus which is capable of collecting early information of an earthquake, based on which the apparatus judges whether or not it is necessary to give a warning before the arrival of the principal shock of the earthquake. This portable early earthquake warning apparatus is provided with: position information receiving means; earthquake early warning receiving means; and warning necessity judging means which judges the necessity of giving a warning before the arrival of the principal shock of an earthquake based on the position information and an earthquake early warning received by the respective receiving means.

With this apparatus, it is possible to give a warning, in railcars and automobiles, before the arrival of the principal shock of an earthquake, and this makes it possible to prevent serious damage by quickly stopping railcars or automobiles.

CITATION LIST

Patent Literature

Patent Literature 1: JP-A-2007-72917
Patent Literature 1: JP-A-2005-283491

SUMMARY OF INVENTION

Technical Problem

There may be a case in which an earthquake occurs immediately after a communication apparatus receives an earthquake early warning, and the user of the communication apparatus, trying to contact a fire station or his/her family, gets buried under furniture and thus cannot operate the apparatus to make a call. Cited References 1 and 2 do not discuss any methods for dealing with such a situation at all.

Solution to Problem

According to an aspect of the present invention, a communication apparatus comprises an incoming call detection section which is connected to a line and detects an incoming call from the line, a microphone, a speech recognition section which recognizes speech inputted from said microphone, a communication section, and a control section. Here, if the incoming call detection section detects an incoming call from the line, the speech recognition section starts recognition of speech from the microphone, and, if the speech recognition section recognizes existence of speech from the microphone, the control section controls the communication section to originate a call to a predetermined party.

According to another aspect of the present invention, a communication apparatus comprises an incoming call detection section which is connected to a line and detects an incoming call from the line, a microphone, a speech recognition section which recognizes speech inputted from said microphone, a time counting section which performs counting of a predetermined period of time; a communication section, and a control section. Here, if the incoming call detection section detects an incoming call from the line, the speech recognition section starts recognition of speech from the microphone, and the time counting section starts the counting of the predetermined period of time, and, if the speech recognition section recognizes existence of speech from the microphone before the counting of the predetermined period of time is completed, the control section controls the communication section to originate a call to a predetermined party.

According to the present invention, it is preferable that, when the communication section originates a call to a predetermined party, if the predetermined party does not answer the call, the control section control the communication section to stop the call and then originate a call to the predetermined party again.

According to the present invention, it is preferable that, when the communication section originates a call to a predetermined party, if the predetermined party does not answer the call, the control section control the communication section to repeat a call-originating operation until the predetermined party answers.

According to the present invention, it is preferable that, when the communication section originates a call to a predetermined party, if the predetermined party does not answer the call, the control section controls the communication section to stop the call and then originate a call to another party.

According to another aspect of the present invention, a communication apparatus comprises a disaster information receiving section which is connected to a line and receives disaster information from the line, a microphone, a speech recognition section which recognizes speech inputted from said microphone, a communication section, and a control section. Here, when the disaster information receiving section receives disaster information from the line, the speech recognition section starts recognition of speech from the microphone, and, if the speech recognition section recognizes existence of speech from the microphone, the control section controls the communication section to originate a call to a predetermined party.

According to another aspect of the present invention, a communication apparatus comprises a disaster information receiving section which is connected to a line and receives disaster information from the line, a microphone, a speech recognition section which recognized speech inputted from said microphone, a time counting section which performs counting of a predetermined period of time, a communication section, and a control section. Here, when the disaster information receiving section receives disaster information from the line, the speech recognition section starts recognition of speech from the microphone and the time counting section starts the counting of the predetermined period of time, and, if the speech recognition section recognizes existence of speech from the microphone before the counting of the predetermined period of time is completed, the control section controls the communication section to originate a call to a predetermined party.

According to the present invention, it is preferable that, when the communication section originates a call to a predetermined party, if the predetermined party does not answer the call, the control section control the communication section to stop the call and then originate a call to the predetermined party again.

According to the present invention, it is preferable that, when the communication section originates a call to a predetermined party, if the predetermined party does not answer the call, the control section control the communication section to repeat a call-originating operation until the predetermined party answers.

According to the present invention, it is preferable that, when the communication section originates a call to a predetermined party, if the predetermined party does not answer the call, the control section controls the communication section to stop the call and then originate a call to another party.

Advantageous Effects of Invention

According to the present invention, if the incoming call detection section detects an incoming call from a line, the speech recognition section starts recognition of speech from the microphone, and if the speech recognition section recognizes existence of speech from the microphone, the control section controls the communication section to originate a call to a predetermined party. As a result, even in a case in which a user is not able to originate a call by using a handset after an incoming call is received, the user can originate a call to a specific party simply by uttering a voice to thereby establish an emergency contact.

According to the present invention, if the incoming call detection section detects an incoming call from a line, the speech recognition section starts recognition of speech from the microphone, and the time counting section starts counting a predetermined period of time, and if the speech recognition section recognizes existence of speech from the microphone before the counting of the predetermined period of time is completed, the control section controls the communication section to originate a call to a predetermined party. As a result, even in a case in which a user is not able to originate a call by using a handset after an incoming call is received, the user can originate a call to a specific party simply by uttering a voice to thereby establish an emergency contact; furthermore, it is also possible to return the apparatus to a standby state after a predetermined period of time, and thus the user does not need to carry out a troublesome operation to return the apparatus to the standby state by himself/herself.

According to the present invention, when the disaster information receiving section receives disaster information from a line, the speech recognition section starts recognition of speech from the microphone, and if the speech recognition section recognizes existence of speech from the microphone, the control section controls the communication section to originate a call to a predetermined party. As a result, even in a case where a user is not able to originate a call by using a handset after disaster information is received, the user can originate a call to a specific party simply by uttering a voice to thereby establish an emergency contact.

According to the present invention, when the disaster information receiving section receives disaster information from the line, the speech recognition section starts recognition of speech from the microphone and the time counting section starts counting a predetermined period of time, and if the speech recognition section recognizes existence of speech from the microphone before the counting of the predetermined period of time is completed, the control section controls the communication section to originate a call to a predetermined party. As a result, even in a case where a user is not able to originate a call by using a handset after disaster information is received, the user can originate a call to a specific party simply by uttering a voice to thereby establish an emergency contact; furthermore, it is also possible to return the apparatus to a standby state after a predetermined period of time, and thus the user does not need to carry out a troublesome operation to return the apparatus to the standby state by himself/herself.

DESCRIPTION OF EMBODIMENTS

Hereinafter, embodiments of the present invention will be described with reference to the drawings. Note that the embodiments herein are merely illustrative and the present invention is not limited to these embodiments.

Examples (1-1. Configuration of Telephone System)

Figure 1:
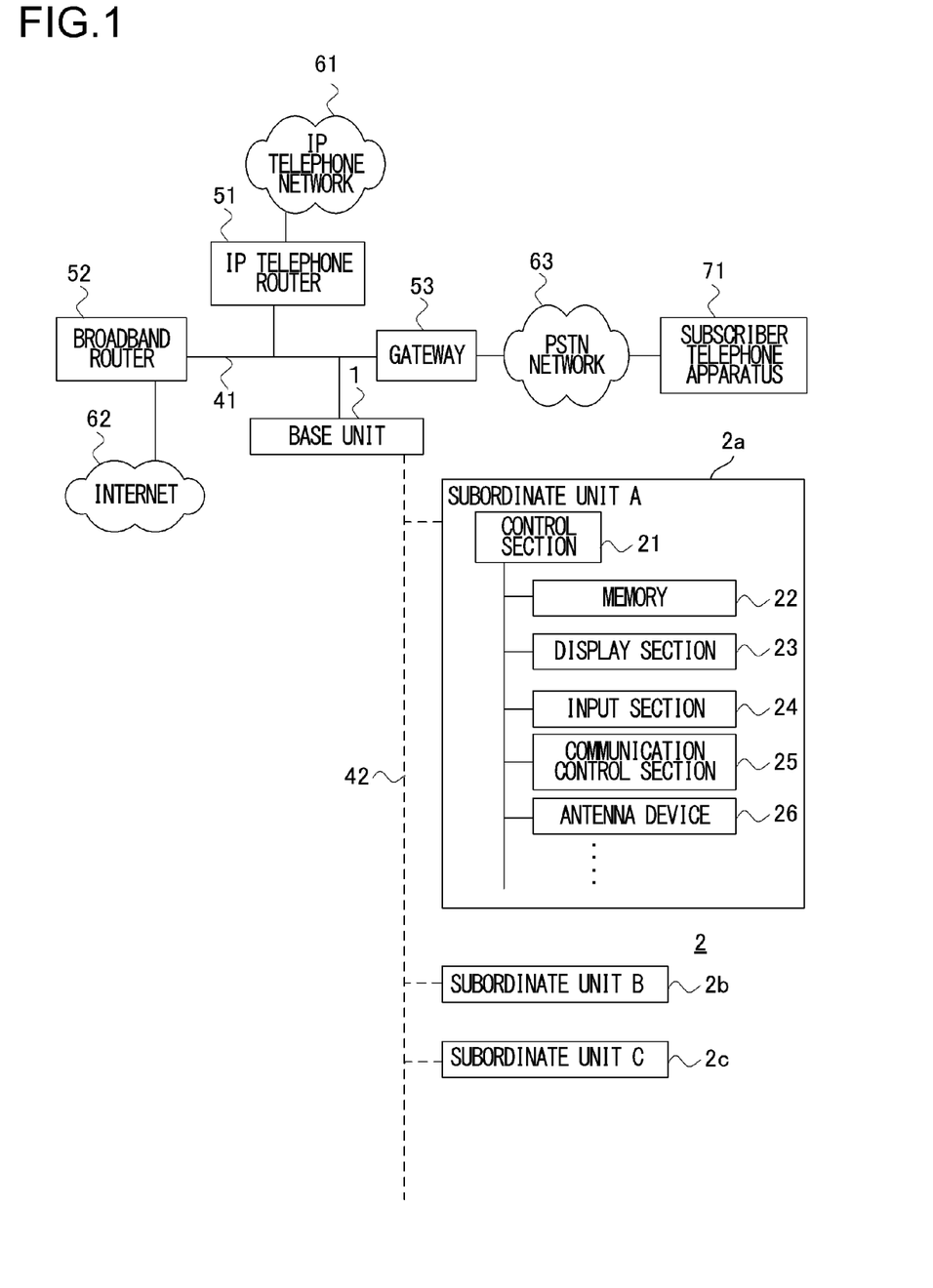
FIG. 1 A block diagram showing a configuration of a telephone system of an example to which the present invention is applied.

FIG. 1 is a block diagram showing a configuration of a telephone system which includes a cordless telephone apparatus (a communication apparatus) of the present invention. The system includes at least a base unit 1, a subordinate unit 2, a wired LAN (Local Area Network) 41, a wireless communication network 42, an IP (Internet Protocol) telephone router 51, a broadband router 52, a gateway 53, an IP telephone network 61, the Internet 62, a PSTN network 63 (=Public Switched Telephone Network), and a subscriber telephone apparatus 71.

The base unit 1 is an IP telephone apparatus that is capable of providing speech communication via a telephone network by being connected to the wired LAN 41. The base unit 1 also has a relay function for relaying communication between the wired LAN 41 and the wireless communication network 42. Accordingly, the subordinate unit 2, which will be described later, is able to establish a call through the IP telephone network 61 or the PSTN network 63 relayed by the base unit 1. Furthermore, the base unit 1 has a function of receiving, via the Internet 62, an earthquake early warning distributed by a meteorological agency. A detailed description of an internal configuration of the base unit 1 will be given later.

The subordinate unit 2 is a wireless communication apparatus which is capable of establishing speech communication with other telephone apparatuses via the IP telephone network 61 or the PSTN network 63 by being connected to the wireless communication network 42 to thereby communicate with the base unit 1.

The wired LAN 41 is a local network in which the base unit 1, the IP telephone router 51, the broadband router 52, the gateway 53, etc. are connected by cables. These devices can communicate with one another by being connected to the wired LAN 41. Examples of physical means for constructing the wired LAN 41 are, for example, 10BASE-T (specified in the IEEE802. 3i standard) and 100BASE-TX (specified in the IEEE802. 3u standard) using twisted pair cables.

The wireless communication network 42 is a small-scale communication network in which the base unit 1 and a plurality of subordinate units 2 are wirelessly connected. Specifically, for example, in the wireless communication network 42, mutual communication is performed by using a communication method based on FHSS-WDCT (Frequency Hopping Spread Spectrum-Worldwide Digital Cordless Telephone) which uses a radio wave in a frequency band of 2.4 GHz (gigahertz).

The IP telephone router 51 and the broadband router 52 are network relay devices for interconnecting a plurality of IP networks. Specifically, the IP telephone router 51 and the broadband router 52 each analyzes part of the protocol of the Network Layer (Layer 3) and of the Transport Layer (Layer 4) of the OSI (Open Systems Interconnection) Reference Model to perform transfer. In the present embodiment, the IP telephone router 51 has a role of connecting two IP networks, namely, the wired LAN 41 and the IP telephone network 61 to each other. Also, the broadband router 52 has a role of connecting two IP networks, namely, the wired LAN 41 and the Internet 62 to each other.

The gateway 53 is a protocol converter for interconnecting networks that use different protocols. For example, the gateway 53 connects the wired LAN 41 and the PSTN network 63 to each other, and performs signal conversion using a signaling protocol such as the SIP, to thereby establish communication between these networks.

The IP telephone network 61 is a communication network in which the VoIP (Voice over Internet Protocol) technology is applied to the whole or part of the network, and a communication line used in the IP telephone network 61 is a so-called broadband line such as FTTH (Fiber To The Home) or ADSL (Asymmetric Digital Subscriber Line). Note that the VoIP is a technology for compressing and converting speech into packets by various coding methods and transferring the packets in real time over an IP network. This makes it possible to provide, over the IP telephone network 61, not only a voice call service but also, for example, a video call service in which images are transmitted and received.

The Internet 62 is a wide area communication network which is constructed by interconnecting networks that are based on communication protocols. An international communication network is constructed by linking various computer networks different in scale to one another. As communication protocols, mainly the TCP/IP protocols are adopted as standard communication protocols for the Internet 62.

The PSTN network 63 is a general subscriber telephone network. The PSTN network 63 is used by connecting a telephone apparatus to an end thereof, to make a voice call to a communication party with whom connection is established by a line switching system. The subscriber telephone apparatus 71 is a telephone apparatus for a telephone subscriber to make a voice call to another subscriber by using a telephone apparatus or an IP telephone apparatus, via the PSTN network 63.

<1-2. Internal Configuration of Base Unit>

Figure 2:
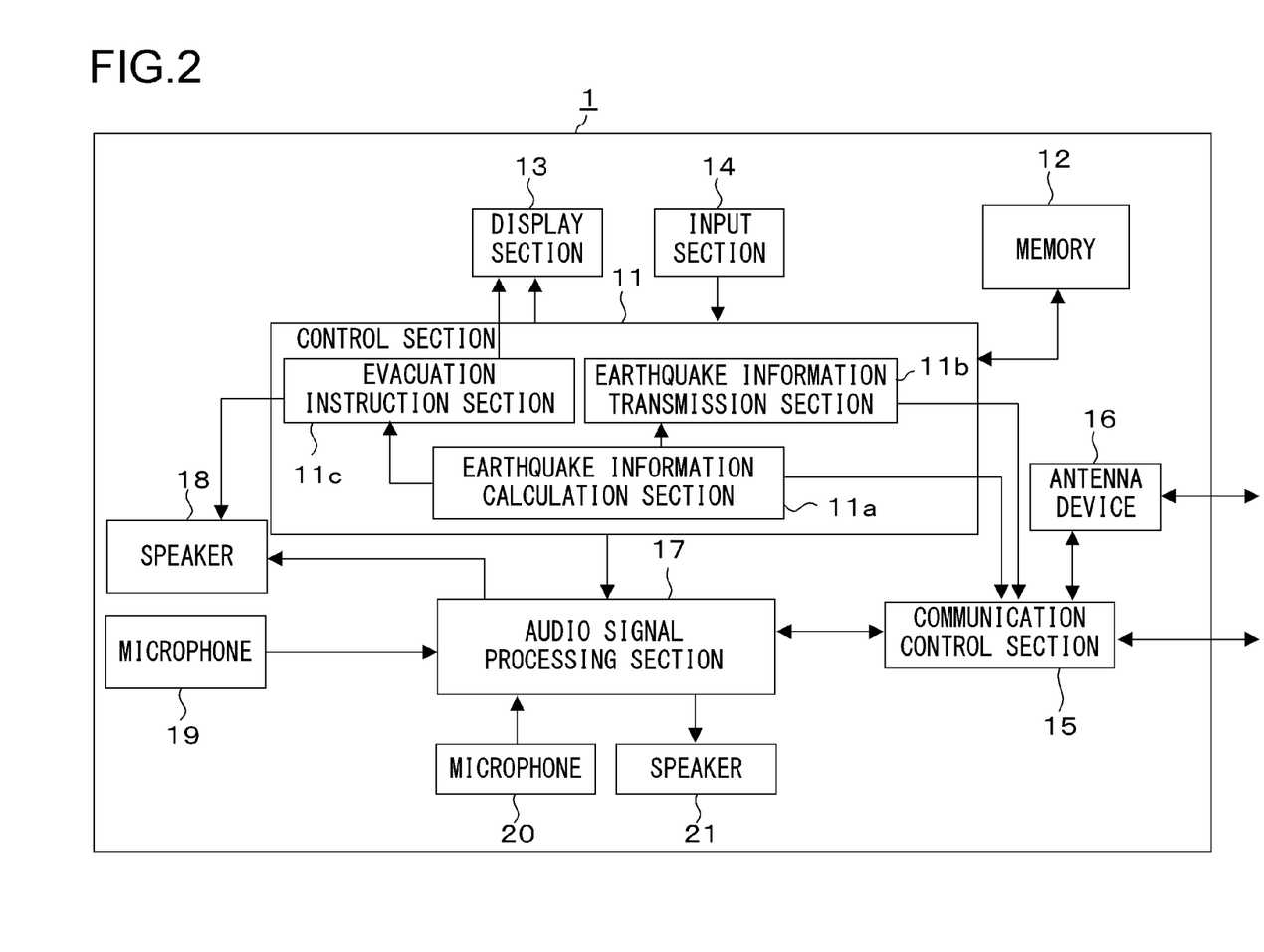
FIG. 2 A block diagram showing a configuration of a base unit of an apparatus of the example.

FIG. 2 is a block diagram showing an internal configuration of the base unit 1. The base unit 1 includes at least a control section 11, a memory 12, a display section 13, an input section 14, a communication control section 15 (=a communication section), an antenna device 16, a sound signal processing section 17, a speaker 18, and a microphone 19. Incidentally, the speaker 18 and the microphone 19 are incorporated in a handset which is not shown.

The control section 11 is a central processing device which controls components of the base unit 1 to thereby perform overall control of communication control processing (e.g., transmission/reception of sound data, origination of outgoing calls, and detection of incoming calls). As functional sections that are achieved when a program is executed by an arithmetic processing section of the control section 11, the control section 11 includes an earthquake information calculation section 11*a*, an earthquake information transmission section 11*b*, and an evacuation instruction section 11*c*.

The earthquake information calculation section 11*a* receives an earthquake early warning from the Internet 62 by using the communication control section 15. The earthquake early warning includes data such as an earthquake detection time when an earthquake is detected, an earthquake identification number of the earthquake, an epicenter geographical name code of the earthquake, the latitude/longitude of the epicenter, the depth of the hypocenter of the earthquake, the magnitude of the earthquake, an estimated maximum intensity of the earthquake, accuracy of data (in connection with a system, processing method, and the like used in the measurement), etc. The earthquake early warning includes an estimated earthquake intensity and an estimated period of time remaining before the arrival of the principal shock, but they are rough estimations, and thus, it is necessary for an apparatus on the receiving side to calculate more accurate estimated earthquake intensity and the like for a corresponding area.

There are roughly two types of processing for the calculation, namely, single-station processing and multi-station processing. The single-station processing is local, spot-focused measurement processing, such as the P-wave detection or the level method, which is performed on the assumption that an earthquake has occurred near the station. The multi-station processing is for calculating an estimated earthquake intensity and a principal shock arrival time for a specific location, by using results of the single-station processing by a plurality of stations. Typical processing methods include the territory method and the grid search method.

The earthquake information calculation section 11*a* performs multi-station processing based on a result of single-station processing which is included in an earthquake early warning and the latitude/longitude information stored in the memory 12. Specifically, for example, firstly, three elements of the earthquake are obtained from results of single-station processing by multiple stations (epicenter: X, Y; time: T; magnitude: M). Further, an epicentral distance D at a specific location (i.e., a distance from the epicenter X,Y to the specific location X0, Y0) D is obtained, and also, a felt radius R is obtained from the magnitude M of the earthquake. Here, the specific location means the latitude/longitude of the location of the base unit 1.

The earthquake information calculation section 11*a* obtains a reference intensity Sr at the specific location based on the epicentral distance D, the magnitude M of the earthquake, and the depth H of the hypocenter, and then obtains an amplification factor A for the specific location based on its geological conditions and the like. The earthquake information calculation section 11*a* uses the reference intensity Sr and the amplification factor A to thereby obtain an estimated intensity, a maximum velocity, a maximum acceleration, a maximum displacement, an estimated arrival time, and the like of the principal shock (S-wave). Note that the calculation method used by the earthquake information calculation section 11*a* is not limited to the above, but may be modified as necessary according to how it is used and what data is included in the earthquake early warning.

On receiving calculation results from the earthquake information calculation section 11*a*, the earthquake information transmission section 11*b*, by using the communication control section 15, transmits, to the subordinate unit 2, earthquake information including the calculation results of an estimated arrival time of the principal shock, an estimated earthquake intensity, and an estimated period of time remaining before the arrival of the principal shock.

On receiving the estimated period of time remaining before the arrival of the principal shock from the earthquake information calculation section 11*a*, the evacuation instruction section 11*c* makes the display section 13 display the information of the estimated period of time as text data.

The memory 12 is a storage medium for temporarily storing various data retained by the base unit 1, and is configured as a writable RAM (Random Access Memory), a flash memory, or the like, for example. The memory 12 serves as a buffer memory for temporarily storing data processed in various communication control processing performed by the control section 11, instruction commands given by the user, etc. The memory 12 also has a role of storing latitude/longitude information for calculating the estimated arrival time of the principal shock. Furthermore, the memory 12 is capable of storing one or more telephone numbers of parties to whom calls are automatically originated if speech is detected for a predetermined period of time after an incoming call or an earthquake early warning is received. The user can register such telephone numbers by operating the input section 14.

The display section 13 displays, to the user, various information that the base unit 1 retains (e.g., a telephone number of a caller that is obtained when an incoming call is received). The display section 13 is, for example, a display device such as a liquid crystal panel that is small in size and consumes only a small amount of power. The input section 14 is provided for the user to perform various operations thereon (e.g., entering the telephone number of a party to whom the user intends to make a call) to establish communication by using the base unit 1. The input section 14 typically includes a plurality of operation buttons, such as number buttons and a redial button.

The communication control section 15 is a communication interface for connecting the base unit 1 to the wired LAN 41. The communication control section 15 is capable of performing call-receiving processing, call-originating processing, etc., in an IP telephone system by communicating with a call control server (not shown) which is connected to the wired LAN 41. The communication control section 15 also controls radio communication that is performed, by using the antenna device 16, via the wireless communication network 42.

The antenna device 16 is a radio communication device for transmitting/receiving radio communication waves to/from the subordinate unit 2. The antenna device 16 performs radio communication in accordance with, for example, a communication method compliant with a predetermined communication standard such as FHSS-WDCT (Frequency Hopping Spread Spectrum-Worldwide Digital Cordless Telephone). This makes it possible to establish speech communication, data communication, and the like with the subordinate unit 2.

The sound signal processing section 17 performs decoding processing to decode sound data which is inputted thereto by the communication control section 15, and then provides the resultant sound signal to the speaker 18. The sound signal processing section 17 provides the communication control section 15 with sound data that the sound signal processing section 17 generates by performing predetermined encoding processing to encode a sound signal that is inputted from the microphone 19. Accordingly, these pieces of sound information are transmitted to another telephone apparatus that is connected to the base unit 1 via the wired LAN 41, the wireless communication network 42, or the IP telephone network 61, for example. The sound signal processing section 17 also has a function of transmitting a voice message stored in the memory 12 in advance to the communication control section 15. Furthermore, the sound signal processing section 17 also has a so-called speech recognition function of recognizing speech from a signal inputted thereto from the microphone 19 or from a microphone 20.

The microphone 19 and the speaker 18 are a microphone and a speaker of a handset (not shown), and the handset is connected via, for example, a curl cord to the base unit 1.

The other microphone 20 and a speaker 21 are incorporated in the base unit 1 main body to allow the user to talk over the telephone without holding the handset in hand. For example, when the user carries out speech communication over the telephone, with the handset placed on the base unit 1, voices of the called party is outputted from the speaker 21, and voices of the user is inputted through the microphone 20. The microphone 20 and the speaker 21 allow the user to make a so-called hands-free call. Here, amplifiers connected to the speaker 18 and the microphone 19 is designed to have a higher upper limit of gain than amplifiers connected to the speaker 21 and the microphone 20. As a result, speech can be outputted with higher power from the speaker 18 than from the speaker 21, and on the other hand, speech from the microphone 20 can be inputted to the base unit 1 main body with higher power than speech from the microphone 19.

Figure 3:
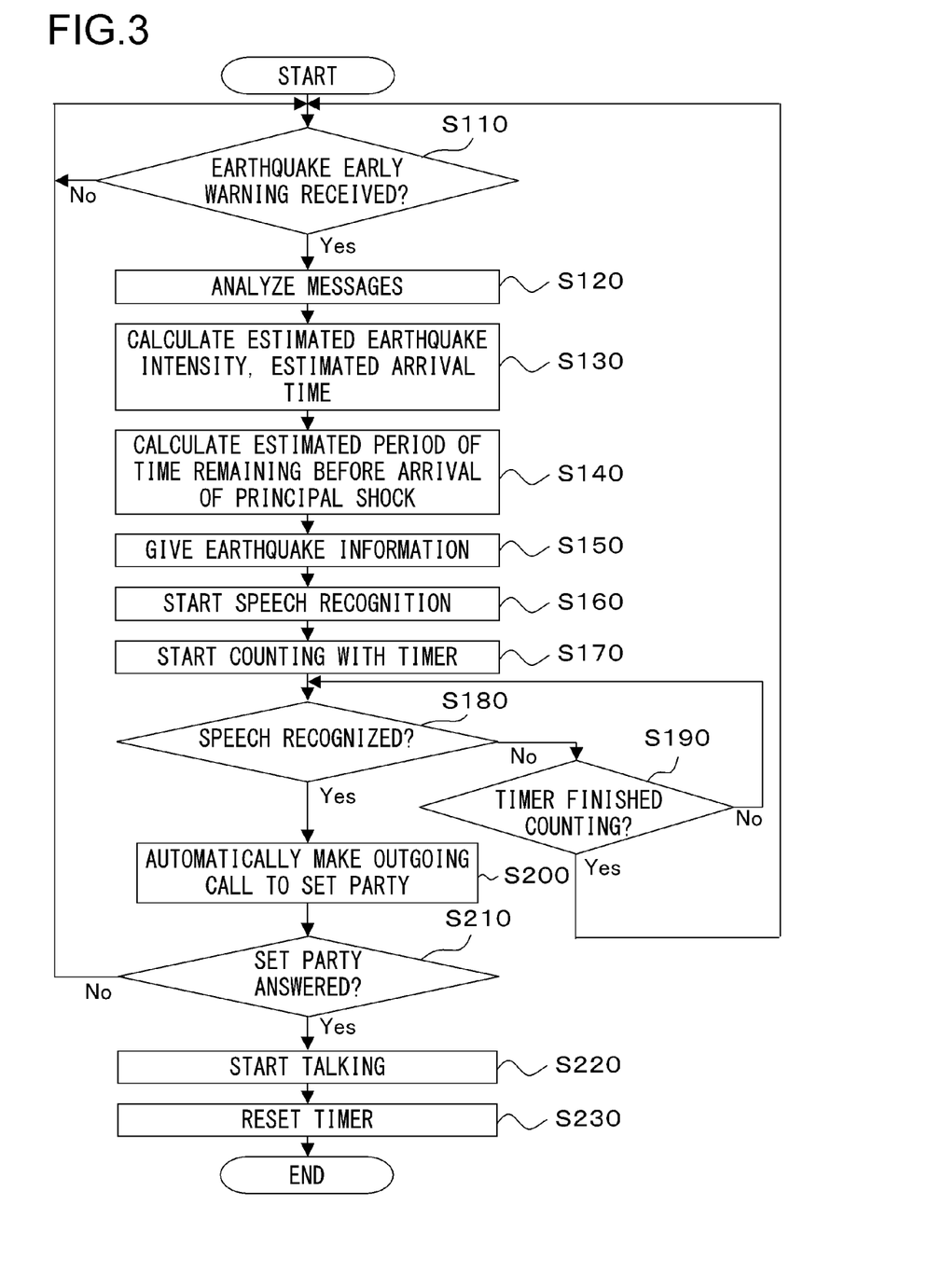
FIG. 3 A flow chart showing the operation of the apparatus of the example.

Next, a description will be given below of an apparatus of an example to which the present invention is applied. FIG. 3 shows a flow of a process performed by the base unit 1 while it is in a stand-by state standing-by to receive an earthquake early warning. The flow of the process shown in FIG. 3 can be started any time in a state in which a power supply of the base unit 1 is turned on and communication with the Internet 62 is made possible. After the process is started, the earthquake information calculation section 11a, in step S110, judges whether or not an earthquake early warning has been received via the communication control section 15 from the Internet 62.

In a case in which it is judged that no earthquake early warning has been received, step S110 is performed again, and monitoring is continued until an earthquake early warning is detected. In a case in which reception of an earthquake early warning is detected, the earthquake information calculation section 11a, in step S120, performs analysis processing on contents of the earthquake early warning. In this way, various parameters included in the contents, such as one for calculating an estimated earthquake intensity and one for calculating an estimated period of time remaining before the arrival of the principal shock of an earthquake, are obtained.

Next, the earthquake information calculation section 11a, in step S130, performs arithmetic processing by using the above-obtained parameters and the latitude/longitude information stored in the memory 12 in advance. In this way, an estimated earthquake intensity and an estimated arrival time of the principal shock of the earthquake at an area in which the base unit 1 is placed are calculated.

Next, in step S140, the earthquake information calculation section 11a calculates an estimated period of time remaining before the arrival of the principal shock. For example, a current time is obtained from a clock circuit (not shown), and difference between the current time and the estimated arrival time of the principal shock obtained in step S130 is calculated, and thereby the estimated remaining period of time before the arrival of the principal shock is calculated.

Next, in stet S150, the estimated earthquake intensity, the estimated arrival time of the principal shock, and the estimated period of time remaining before the arrival of the principal shock which have been calculated by the earthquake information calculation section 11a are displayed on the display section 13.

In step 160, the control section 11, by controlling the sound signal processing section 17, starts recognition of speech from the microphone 20. The recognition of speech here is performed with a method in which, if sound which is inputted from the microphone 20 is judged to be of a predetermined level or higher, it is judged that speech exists in the sound, or a method in which input of speech is detected by extracting phonemes from the waveform or the spectrum of sound inputted from the microphone 20. Incidentally, in this embodiment, the sound signal processing section 17 is provided to perform the above-described speech recognition, but such a speech recognition function may be incorporated in the control section 11. Specifically, the function of controlling each section, the speech processing function, and a so-called DSP (Digital Signal Processor) may be integrated in one same chip.

In step 170, the control section 11 starts counting a predetermined period of time (for example, ten minutes) by using a timer (a time counting section) (not shown) incorporated therein.

In step 180, if it is judged that the sound signal processing section 17 has detected speech from the microphone 20, the control section 11 proceeds with the process to step 200, and, if not, to step 190.

In step 190, the control section 11 returns the process to step 110 if it judges that the counting of the predetermined period of time by the timer incorporated therein is completed, and, if not, the control section 11 returns the process to step 180.

Next, in step 200, the control section 11 controls the communication control section 15 to automatically originate a call to a party (for example, a telephone number of a fire station, a family member, etc.) stored in the memory 12 in advance.

In step 210, the control section 11 proceeds with the process to step 220 if it detects, from the communication control section 15, a signal indicating that the party has received the call and answered the incoming call, and, if not, the control section 11 returns the process to step 110.

In step 220, the control section 11, by controlling the communication control section 15 and the sound signal processing section 17, connects the microphone 20 and the speaker 21 to a line to allow the user to make a so-called hands-free call by using the microphone 20. Thereafter, when the call is finished, the control section 11, in step 230, resets the timer, and returns to the stand-by state.

Here, the configuration may be such that an earthquake early warning can be received between step 180 and step 190 of this example, and, if an earthquake early warning is received between step 180 and step 190, the earthquake early warning is notified via the display section 13 or the speaker 21 while a call is carried out with a party. Incidentally, the present invention is applicable to the following embodiments.

(A) In the above embodiments, as communication lines via which the base unit 1 receives earthquake early warnings, the wired LAN 41 and the Internet 62 are used; however, a network may be formed such that earthquake early warnings are received, for example, via a dedicated line or a cable television line. Alternatively, earthquake early warnings may be obtained from broadcasting waves such as digital terrestrial broadcasting waves and BS digital broadcasting waves.

(B) The above embodiments deal with a cordless telephone apparatus including the base unit 1 and the subordinate unit 2 as an example of a communication apparatus according to the present invention provided with the function of notifying earthquake early warnings; however, the present invention may be embodied in other communication apparatuses as long as they are connected to a wide area communication network and capable of receiving earthquake early warnings.

For example, the present invention may be practiced in the form of an application program or the like executed by a facsimile apparatus, a mobile telephone apparatus provided with wireless LAN connection function, an Internet telephone apparatus, a navigation apparatus, a PDA (Personal Digital Assistant), or a notebook computer.

(C) In the above embodiments, the various functional sections of the base and subordinate units 1 and 2 related to the evacuation instruction processing of the present invention are achieved by a program executed by an arithmetic processing section such as a micro processor; however, the various functional sections may be achieved by a plurality of circuits.

(D) In the above embodiments, in step S110, the process is switched based on a condition of whether or not an earthquake early warning has been received; however, the process may be switched in step S110 based on other conditions. For example, the condition may be whether or not an incoming call has been detected. In this case, if an incoming call is detected, steps S120 to S150 are skipped, and step S160 (where speech recognition is started) is carried out. Then, if speech is recognized in step S180, a call is originated to a set party. This makes it possible for a user who is not able to originate a call by using a handset for some reason after the reception of an earthquake early warning to originate a call to a specific party just by uttering a voice to establish an emergency contact.

Embodiments of the apparatus of this example may be as follows.

(A) In the above examples, in step 200, a call is originated to a party stored in the memory 12; however, if the party does not answer the call, the call-originating operation may be stopped, and then a call may be originated again to the same party.

(B) In the above examples, in step 200, a call is originated to a party stored in the memory 12; however, step 200 may be such that, if the party does not answer the call, the call-originating operation is stopped, then a call is originated to the same party again, and this call-originating operation is repeated until the party answers.

(C) In the above examples, in step 200, a call is originated to a party stored in the memory 12; however, if the party does not answer the call, a call may be originated to another party. More specifically, for example, after originating a call to a family member, a call is originated to a fire station.

LIST OF REFERENCE SYMBOLS

1 base unit
11 control section
11*a* earthquake information calculation section
11*b* earthquake information transmission section
11*c* evacuation instruction section
12 memory
13 display section
15 communication control section (communication section)
16 antenna device
18 speaker
19 microphone
20 microphone
21 speaker

The invention claimed is:

1. A communication apparatus, comprising:
an incoming call detection section which is connected to a line and detects an incoming call from the line;
a microphone;
a speech recognition section which recognizes speech inputted from said microphone;
a communication section; and
a control section,
wherein,
if the incoming call detection section detects an incoming call from the line, the speech recognition section starts recognition of speech from the microphone, and, if the speech recognition section recognizes existence of speech from the microphone, the control section controls the communication section to originate a call to a predetermined party.

2. A communication apparatus, comprising:
an incoming call detection section which is connected to a line and detects an incoming call from the line;
a microphone;
a speech recognition section which recognizes speech inputted from said microphone;
a time counting section which performs counting of a predetermined period of time;
a communication section; and
a control section,
wherein,
if the incoming call detection section detects an incoming call from the line, the speech recognition section starts recognition of speech from the microphone, and the time counting section starts counting the predetermined period of time, and, if the speech recognition section recognizes existence of speech from the microphone before the counting of the predetermined period of time is completed, the control section controls the communication section to originate a call to a predetermined party.

3. The communication apparatus of claim 2,
wherein,
when the communication section originates a call to a predetermined party, if the predetermined party does not answer the call, the control section controls the communication section to stop the call and then originate a call to the predetermined party again.

4. The communication apparatus of claim 3,
wherein
when the communication section originates a call to a predetermined party, if the predetermined party does not answer the call, the control section controls the communication section to repeat a call-originating operation until the predetermined party answers.

5. The communications apparatus of claim 2,
wherein,
when the communication section originates a call to a predetermined party, if the predetermined party does not answer the call, the control section controls the communication section to stop the call and then originate a call to another party.

6. A communication apparatus, comprising:
a disaster information receiving section which is connected to a line and receives disaster information from the line;
a microphone;
a speech recognition section which recognizes speech inputted from said microphone;
a communication section; and
a control section,
wherein,
when the disaster information receiving section receives disaster information from the line, the speech recognition section starts recognition of speech from the microphone, and, if the speech recognition section recognizes existence of speech from the microphone, the control section controls the communication section to originate a call to a predetermined party.

7. A communication apparatus, comprising:
a disaster information receiving section which is connected to a line and receives disaster information from the line;
a microphone;
a speech recognition section which recognizes speech inputted from said microphone;
a time counting section which performs counting of a predetermined period of time;
a communication section; and
a control section,
wherein,
when the disaster information receiving section receives disaster information from the line, the speech recognition section starts recognition of speech from the microphone and the time counting section starts counting a predetermined period of time, and, if the speech recognition section recognizes existence of speech from the microphone before the counting of the predetermined period of time is completed, the control section controls the communication section to originate a call to a predetermined party.

8. The communication apparatus of claim 7,
wherein,
when the communication section originates a call to a predetermined party, if the predetermined party does not answer the call, the control section controls the communication section to stop the call and then originate a call to the predetermined party again.

9. The communication apparatus of claim 8,
wherein,
when the communication section originates a call to a predetermined party, if the predetermined party does not answer the call, the control section controls the communication section to repeat a call-originating operation until the predetermined party answers.

10. The communications apparatus of claim 7,
wherein,
when the communication section originates a call to a predetermined party, if the predetermined party does not answer the call, the control section controls the communication section to stop the call and then originate a call to another party.

* * * * *